June 16, 1931.  T. A. KEEN  1,810,179
STARTING APPARATUS
Filed Nov. 14, 1928   2 Sheets-Sheet 2
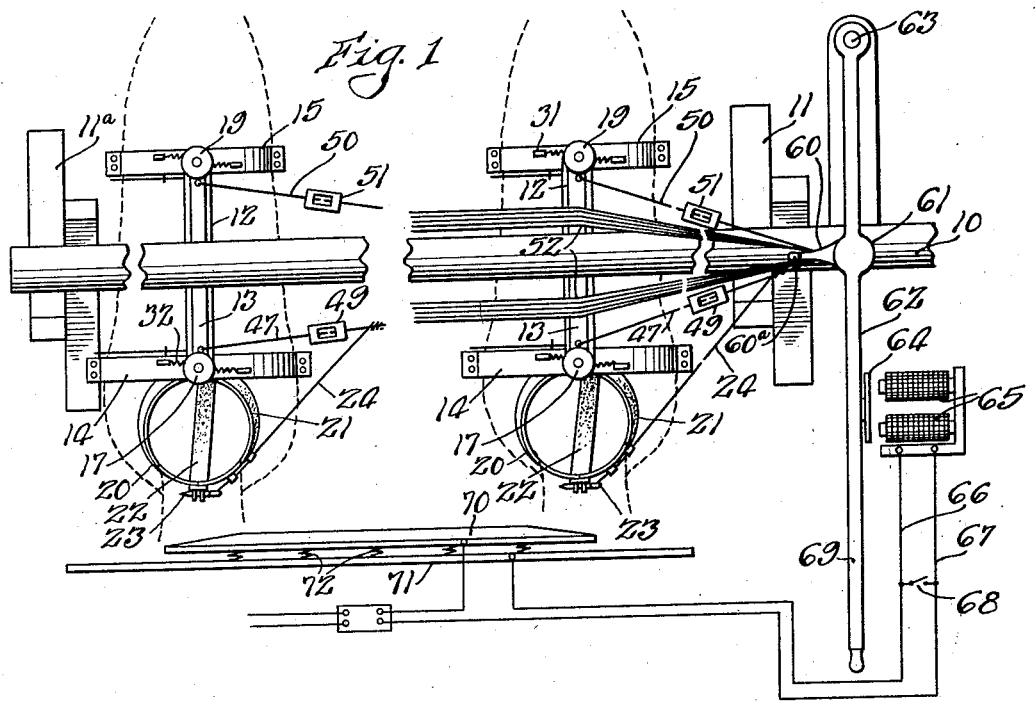
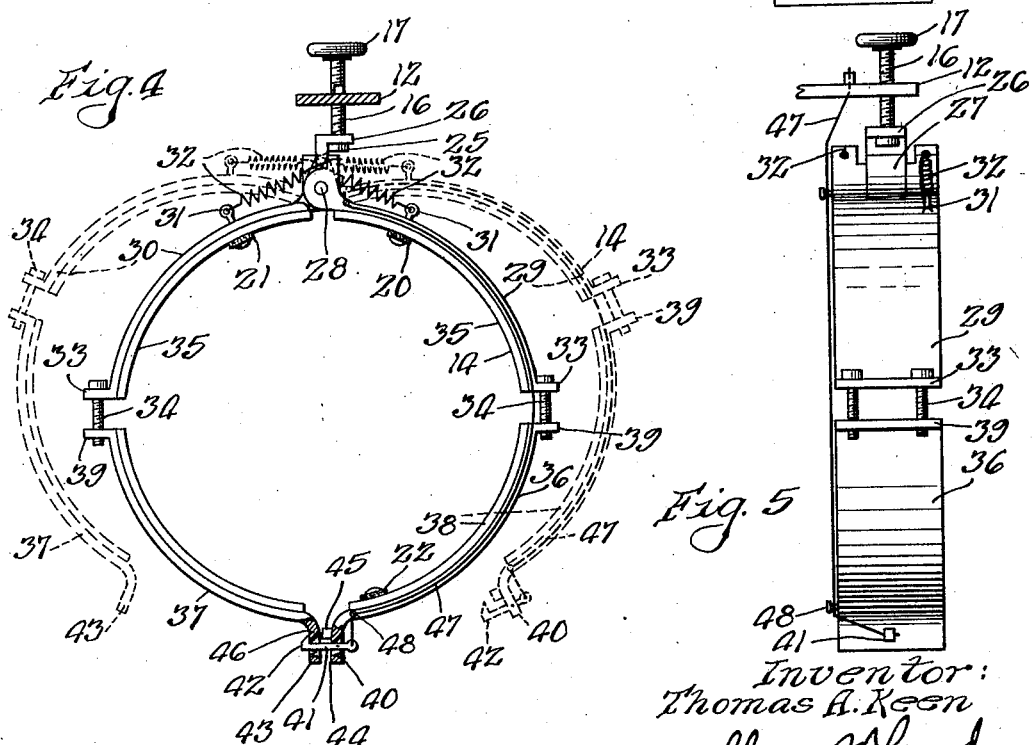
Inventor:
Thomas A. Keen Patented June 16, 1931

1,810,179

UNITED STATES PATENT OFFICE

THOMAS A. KEEN, OF ST. LOUIS, MISSOURI, ASSIGNOR TO HANNAH M. SMITH, OF CHICAGO, ILLINOIS

STARTING APPARATUS

Application filed November 14, 1928. Serial No. 319,335.

The present invention relates to a dog racing apparatus, and has to do particularly with a means to take the place of a starting cage which is almost universally employed in dog racing at the present time.

The objects of the invention, among others, are as follows:

An improved starting device for greyhounds in which the dogs are not confined in stalls or in cages.

An apparatus for holding a dog before a race and until his release is desired, permitting him to attain a superior opportunity to quickly begin his pursuit of the lure.

Improved starting apparatus for greyhounds in which the dogs may be released simultaneously or in a timed sequence.

A starting apparatus in dog races having a release means to facilitate correct timing and thereby obtain truly accurate knowledge as to the actual speed of various dogs.

Apparatus for the release of dogs in pursuit of a lure and comprising parts which will not impede the dog in obtaining a quick start and which will at all times provide a source of protection to the animal in its efforts to get started.

An improved starting apparatus for dogs which will permit of the admirers of any dog or dogs viewing the behavior of the animal at the starting post to determine the actual value of the dog for speed, for quick starting, and coursing, and giving an opportunity to such observer to learn its faults so that these may be corrected, these faults not being discernible from the outside of a starting cage which gives out no information which will be helpful for the purpose of increasing that dog's time in running a race over a predetermined course.

These objects, and such other objects as may hereinafter appear, are obtained by the novel construction, combination, and arrangement of the several parts which constitute the embodiment of the invention herein described.

Two sheets of drawings accompany this application and are hereby made a part of this specification.

In said drawings:

Figure 1 is a fragmentary plan view of a starting device hereinafter described and in association therewith are shown a plurality of alternative actuating means, only the end means being shown;

Figure 4 is a detail front view of the main dog harness shown in Figure 3; and

Figure 5 is an enlarged detail side view of such harness member.

Like reference characters are used to designate similar parts in the drawings and in the description of the apparatus.

Figure 2:
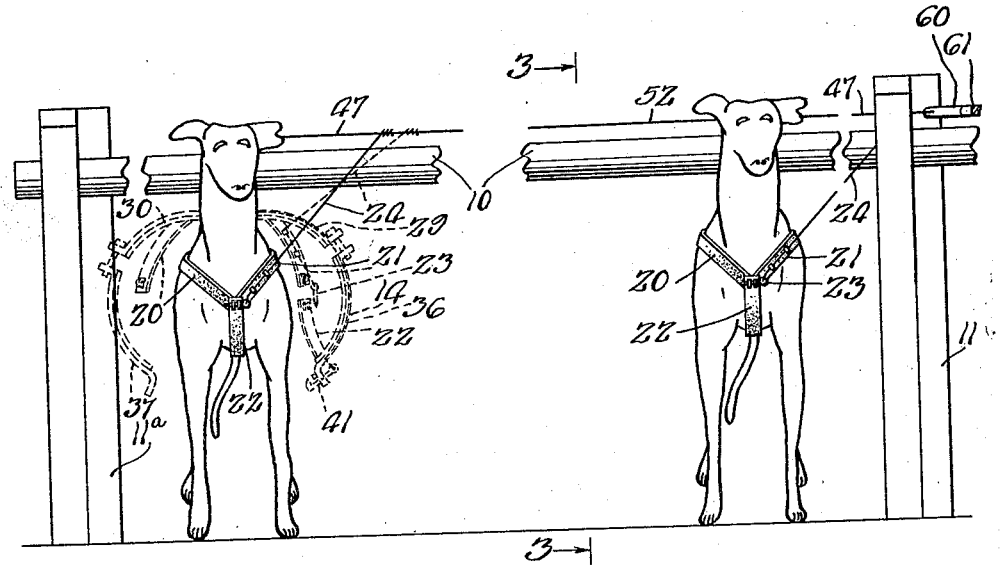
Figure 2 is a front elevation of the device shown in Figure 1 and showing only the end dogs.

The present starting device comprises ordinarily a pipe or tubular member or spar or beam 10 of suitable length, such member sometimes being called linear member and being adapted to extend from the inner fence, or hub rail as it is called, designated 11, and onto the track in the direction of the outer or lure rail along which the car carrying the lure apparatus generally operates. The linear member 10 need not ordinarily extend across the track for if it did and dogs were held across its entire length, it would hold one or more dogs in a position to be struck by the rapidly moving lure which obtains its impetus and passes the dogs before the dogs are released as previously stated.

It will be noted that the linear member 10 extends into the field and over the inner rail 11 and it may be supported at such end in any suitable way. The fence rail 11 may be the support therefore, or an independent support may be applied thereto. For convenience, a horse 11$^a$ like a carpenter's horse may be put at the left hand end of Figure 1 to assist in holding the member or support 10 in a truly horizontal position.

Disposed upon the linear member 10 in spaced relation are dog harness supporting members, these being transverse to the axis member 10 and longitudinal with respect to the track. Each of these members is designated 12, and each provides a means for holding the holding apparatus units one of which is supplied for each dog. The harness unit for each dog is identical. Each harness is adapted to be actuated by the same means, namely, a cable, wire or other suitable flexible movable member, as will now be pointed out.

Figure 3:
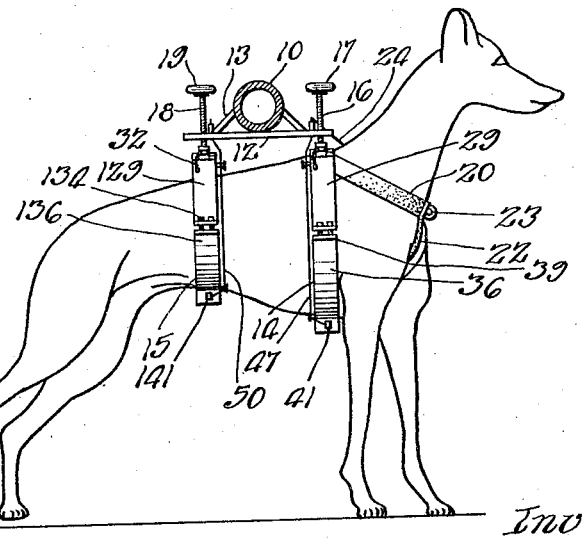
Figure 3 is a side elevation of a dog and of the dog holding device, such view being taken on the line 3—3 of Figure 2.

An examination of Figure 2 will show that the holding harness extends about the front of a dog, for the purpose of preventing the dog from pulling away from the member 10 and ahead of the starting line. The front harness is released concurrently and conjointly with the body harnesses which are best shown in Figure 3.

Each member 12 is provided with a pair of braces 13 for maintaining it in proper position upon beam 10. At the top and back of member 12 are the harness members which are adapted to surround the body of the dog, just referred to hereinabove. The rear harness is only necessary for such dogs as have a habit of twisting and turning, and in most instances may be omitted where the dogs have been thoroughly schooled in proper starting.

The structure of the front and back body encircling members is substantially the same, and these body encircling members are designated generally as 14 and 15.

The front harness 14 is supported by an adjustable threaded standard having an adjusting handle 17 whereby the harness 14 may be raised or lowered to adjust it to the size of the dog to be confined therein, all dogs not being of the same size.

The rear harness 15 is supported in a similar manner by a standard 18 having an adjusting handle 19.

To the member 14 is attached the front harness for the dog, hereinabove mentioned, and which comprises a right front strap 20, a left front strap 21, and a chest strap 22. Straps 20 and 21 are of leather and are secured to the member 14 adjacent the top of said member. The strap 22 is secured to a bottom portion of the member 14 and such strap is drawn upwardly between the forelegs of a dog and thereafter it is joined to straps 20 and 21 by a withdrawable sliding pin 23, as is shown in Figure 2.

Straps 20 and 21 have eyelets which when associated with eyelets secured in the strap 22 permit of the three strap members being held by said pin 23, said pin normally being horizontally disposed. In such position, it is not readily dislocated or displaced.

To the member 23 is secured a cable cord or wire 24 which runs through suitable guides on strap 21 and by which said pin 23 may be pulled from its frictionally secured engagement with the dog's straps, thereby releasing said straps 20, 21, and 22 so that the dog may move forwardly. The release of all straps, of course, is conjoint. The members 14 and 15 are opened to release the dogs therefrom at the same instant that the pin 23 slips from the several eyelets in which secured, hence the wire 24 may be made a part of the cable, cord, wire, or other instrumentality which is employed to operate the members 14 or 15 or either of them.

The general structure of members 14 and 15 is the same except that to the member 14 the straps 20, 21, and 22 are affixed and the member 15 is smaller in diameter than the member 14. The top of each of members 14 and 15 is generally in horizontal alignment.

Each member 14 comprises, as previously pointed out, a standard 16 having a handle 17, the standard 16 being in threaded engagement with the cross member 12 so that when there is rotation of the handle 17, the member 14 is drawn toward or forced away from the member 12. Threaded member 16 has an enlarged head 25 and it extends through a top piece 26 forming a part of the member 14.

Top piece 26 has a depending portion 27 through which a bolt 28 is passed. Pivotally associated upon the body of the bolt 28 and in complemental relation to one another are opposed members 29 and 30 which are adapted to be moved in opposite directions, that is, each one outwardly, to release a dog. Each of said members 29 and 30 has an eyelet 31 to which is secured a spring 32, said spring being anchored in the top piece 26 so that the members 29 and 30 are normally spread apart.

Members 29 and 30 at their lower ends have a lug 33 through which a screw 34 passes, and each of said members 29 and 30 is leather or otherwise lined, the lining being marked 35. Such lining comprises a pad to prevent a dog's body coming in direct contact with the metallic portions 29 and 30 and thus avoids chafing, bruising or other injury.

The lower part of the member 14 comprises opposed members 36 and 37 each of which is lined or padded as is indicated at 38, the lining being similar to that disclosed at 35. Member 38 is joined to number 29 and number 36 is joined to number 30, one of the screws 34 being adapted to pass through a lug 39 upon each of said members 36 and 37.

In the member 38, there is disposed upon a pivot 40 a latch 41 which latch has a head 42 insertable into an opening 43 therefor in the member 37. For urging the latch 41 upon member 36 into a locking engagement with the member 37, a spring 44 is provided, having one end thereof attached to the member 38 and the opposite end impinging the trigger 41. To prevent any possibility of the members 36 and 37 losing their alignment, the former has a plurality of lugs 45 between which a lug 46 upon the member 37 is adapted to ride when the members 36 and 37 are in full engagement, thereby avoiding any possibility of a lateral twist or derangement of members 36 and 37 occurring while the dog is held in the harness.

From the outermost end of the latch 41 is a wire cable or cord 47 which is adapted to pass over or through guides 48 upon the member 36 and the member 29. Said cable 47 extends upwardly to the member 12 and from thence to the end of the hub end of beam 10. Each cable 47 has provided therein a turn buckle 49 whereby its sections may be adjusted to secure uniform and conjoint operation of all of cables 47.

The structure of member 15 is identical with the structure of member 14, and therefore a detailed description of the parts thereof is omitted. The parts of member 15 corresponding to those herein identified and forming a part of member 14 are marked with the same numerals as the parts in said member 14 except that one hundred is added thereto. The actuating cable for member 15 is designated 50 and the turn buckle in said cable is marked 51.

The cables 47 and 50 are passed through guides 52 and are strung back along the beam 10 and above the members 12 to an actuating member 60, which actuating member has adjacent thereto a stop member 60a to prevent a too great inward extension thereof and too much laxity upon the cables 47 and 50 just referred to.

Said member 60 is disposed upon a U-bolt 61 and has a rocker arm 62 whereby such stop member may be moved to pull the cables 47 and 50, that is, the cables may be drawn in the direction of the member 61 whereby to release the members 14 and 15, as well as straps 21, 22 and 23.

As previously indicated the pin 23 has attached thereto a cable 24 which may be actuated in the same way, there being suitable guides therefor, or it may follow the guides for the other cables. Because such cable wire or cord 24 is relatively short, it may be joined to and form a part of cable member 47 so that it is actuated conjointly with the cable 47.

The rocker arm 62 is disposed about a bolt 63 and said rocker arm 62, for alternative actuation, may be secured to an armature 64 having an electromagnetic control 65 which is adapted to be actuated, from any suitable source of electrical current, as for example, the cables 66 and 67 running to a source of power.

A switch 68 may be employed in one of said cables for the actuation of the electromagnetic control 65 whereby the armature 64 is moved to actuate the rocker arm 62 to pull the cables 47 and 50 and thus release the members 14 and 15 as well as the straps 20, 21 and 22.

As is shown in Figure 1 there may also be a handle upon the rocker arm 62, such handle being designated 69, so that the device may be operated manually rather than electrically.

Further, there is also shown in Figure 1 a third means of control for the starting harness. The cables 67 and 68 are adapted to run to a switch comprising two copper plates 70 and 71, the former being electrically connected to cable 67 and the latter being connected to cable 66. Said plates 70 and 71 are each mounted upon suitable insulatory members which are kept apart by springs 72 so that normally there is no electrical connection between plates 70 and 71. When it is desired to have the dogs released as an incident to the advance of the lure to a certain point beyond the starting line, the plates 70 and 71 with their insulatory mounting are put in the path of the lure. When the lure which has a ground wheel passes over the plate 70, it presses said plate down upon the plate 71 and establishes electrical connection with the electromagnetic control 65 whereby the armature 64 is made to rock the member 62 to release the dog harnesses.

As a modification of the present invention, each harness may have its own releasing mechanism and a separate member 65 and armature 64 supplied to actuate such lever. Likewise, a similar individuality may be attained by employing individual levers for actuating each dog harness manually. In these manners, i. e., by a series of manually controlled levers or mechanically or electrically controlled switches, the dogs may be released at different instants whereby one or more may be given predetermined handicaps over another or other dogs.

While the device 10 is normally transverse of the track, it may be inclined to provide a system for starting the dogs where it is inclined sufficiently to compensate accurately for the absolute difference in the distance between the starting and finishing lines, it being presumed that the dogs remain in certain lanes, defined by the starting position, while circling the track. The dog nearest the lure rail, if he travels outside of the pack at all times, would run the greatest distance if released from a cage or linear member perpendicular to the inner rail at the starting line. The angle of the disposition of beam 10 could readily correct this difference in distance if inclined forwardly.

The apparatus is so light and flexible that it may be transferred to various parts of the track, making it necessary to have one starting apparatus only. The hub rail may also be continuous instead of being gated at predetermined intervals, as it is now, to allow the admission and removal of starting cages.

I claim:

1. In a device for use in maintaining a dog at the starting line of a race course, a member surrounding the dog's body and comprising a separable split ring member having strap members engaging the dog's shoulders, a latch for said ring member, and a pin for securing said straps one to another, said latch and pin being releasable to free the dog from said device.

2. A starting device for use in a dog race comprising an anchoring linear member, movable harness supports depending therefrom, a dog encircling member on each harness support, means for urging said encircling member away from a dog, and latch means for releasably securing said encircling member in an encircling position about a dog.

3. A starting device for use in a dog race comprising a linear member adapted to be moved about a race course, a plurality of trunk encircling members mounted on said member and supported thereby, said trunk encircling members having means to urge them away from a dog when released, and means on said member for releasing said encircling members from about the trunks of the dogs held thereby.

4. A starting device for use in a dog race comprising a linear member, a plurality of trunk encircling members attached to said linear member and supported thereby, said members having separable parts, means for urging said parts away from one another, and means on said linear member for releasing said separable parts one from another to release the dogs held by said trunk encircling members.

5. A starting device for use in a dog race comprising a portable member, a dog harness support upon said portable member, a trunk circling harness on said harness support, and means extending from said harness to said portable member for releasing said harness from a dog held thereby.

6. A starting device for use in a dog race comprising an enlongated member arranged transversely of a race course, a plurality of dog encircling harnesses held aloft thereby, each of said harnesses comprising separable parts, latch means on each of said harnesses for holding said parts together, and means extending from said harness and along said elongated member for actuating said latch means to release the separable parts of each harness one from another.

7. For maintaining a plurality of dogs at the starting line of a race course, a supporting member held from its ends, a series of spaced apart and aligned harnesses disposed on said supporting member and held above the ground thereby, each harness holding a dog and surrounding its trunk in front and in back of its fore-legs, and means for simultaneously releasing the harnesses from the dogs held thereby.

8. For maintaining a dog at the starting line of a race course, a support disposed above the level of said course, a body encircling member on said support for holding said dog and engaging its trunk in front and in back of its fore legs, and means extending from said encircling member to a remote point for releasing said encircling member from about said dog.

9. For maintaining a plurality of dogs at the starting line of a race course, a transversely arranged support disposed above the course, a member surrounding a dog's trunk, a second member engaging its shoulders in front of its fore legs, each of said members being disposed on said transversely arranged support, and means for simultaneously releasing each of said dog engaging members.

10. A linear member arranged transversely of a track and having end support, a plurality of jaws arranged in pairs along said linear member and held above the track thereby, each of said pairs of jaws being adapted to encircle the body of a dog and being normally open, a latch for each of said pairs of jaws, and means on said linear member for releasing said latches.

11. For maintaining a plurality of dogs at the starting line of a race course, a linear member arranged transversely of said course and having end support only, a series of members along said linear member above the course level, each member holding a dog and encircling its trunk and comprising jaws normally open, a latch on each of said members and operable when said members are in a closed position, and release actuating means for releasing said latches.

12. A starting device for use in a dog race comprising a linear member and disposed above a race course, a plurality of trunk encircling members having separable parts depending therefrom, release means for said encircling members to free said separable parts one from another, and means on said linear member for controlling said release means.

THOMAS A. KEEN.